United States Patent
Won

(10) Patent No.: US 11,820,442 B2
(45) Date of Patent: Nov. 21, 2023

(54) REDUNDANCY CIRCUIT OF ELECTRIC POWER STEERING SYSTEM

(71) Applicant: HL MANDO CORPORATION, Pyeongtaek-si (KR)

(72) Inventor: Jong Chun Won, Giheung-gu Yongin-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 227 days.

(21) Appl. No.: 17/424,697

(22) PCT Filed: Jan. 20, 2020

(86) PCT No.: PCT/KR2020/000928
§ 371 (c)(1),
(2) Date: Jul. 21, 2021

(87) PCT Pub. No.: WO2020/153686
PCT Pub. Date: Jul. 30, 2020

(65) Prior Publication Data
US 2022/0135116 A1 May 5, 2022

(30) Foreign Application Priority Data

Jan. 23, 2019 (KR) .......................... 10-2019-0008690

(51) Int. Cl.
*B62D 5/04* (2006.01)

(52) U.S. Cl.
CPC ........... *B62D 5/046* (2013.01); *B62D 5/0484* (2013.01)

(58) Field of Classification Search
CPC ...... B62D 5/046; B62D 5/0484; B62D 5/049; B62D 5/0493; B62D 5/0487; B60W 50/0205
See application file for complete search history.

(56) References Cited

U.S. PATENT DOCUMENTS 2,987,135 A * 6/1961 Harvey .................... B62D 5/06
180/421
4,621,327 A * 11/1986 Dolph .................. B62D 5/0463
701/43
(Continued)

FOREIGN PATENT DOCUMENTS

CN 105026246 A * 11/2015 ............... B62D 5/04
CN 106945720 A 7/2017
(Continued)

OTHER PUBLICATIONS

"The Development of Control Unit in Automotive Electric Power Steering System;" Qun et al.; 2009 Asia-Pacific Conference on Information Processing (vol. 1, pp. 242-245); Jul. 1, 2009. (Year: 2009).*

(Continued)

*Primary Examiner* — Khoi H Tran
*Assistant Examiner* — Jorge O Peche
(74) *Attorney, Agent, or Firm* — Morgan, Lewis & Bockius LLP

(57) ABSTRACT

The present invention relates to a redundancy circuit of an electric power steering system, the redundancy circuit comprising: a plurality of electronic control units for checking whether a breakdown occurs by crossing each other, and adjusting a control ratio according to the occurrence of the breakdown; and a selection control unit for receiving an input of the control ratio and control amount information of the plurality of electronic control units to determine control amounts of each of motors provided in the same number as the plurality of electronic control units.

10 Claims, 2 Drawing Sheets

(56) References Cited

U.S. PATENT DOCUMENTS

| | | | | |
|---|---|---|---|---|
| 4,882,586 A * | 11/1989 | Dolph | B62D 5/0493 | |
| | | | | 341/169 |
| 4,956,590 A * | 9/1990 | Phillips | B62D 5/008 | |
| | | | | 318/489 |
| 5,765,661 A * | 6/1998 | Matsuoka | B62D 5/0463 | |
| | | | | 701/41 |
| 5,845,738 A * | 12/1998 | Nishino | B62D 5/0463 | |
| | | | | 180/443 |
| 5,927,430 A * | 7/1999 | Mukai | B62D 5/049 | |
| | | | | 701/41 |
| 6,505,702 B1 * | 1/2003 | Shinmura | B62D 9/002 | |
| | | | | 701/41 |
| 9,688,302 B2 * | 6/2017 | Endo | B62D 5/0487 | |
| 10,167,012 B2 * | 1/2019 | Asao | H02P 25/22 | |
| 10,766,523 B2 * | 9/2020 | Itou | H02P 5/46 | |
| 10,782,684 B2 * | 9/2020 | Lurie | H04L 67/12 | |
| 11,088,532 B2 * | 8/2021 | Nakamura | H02H 7/08 | |
| 11,305,783 B2 * | 4/2022 | Nakada | H04L 12/40 | |
| 11,639,192 B2 * | 5/2023 | Fujita | G01M 17/06 | |
| | | | | 701/41 |
| 2002/0022914 A1* | 2/2002 | Kawada | B62D 5/0493 | |
| | | | | 180/443 |
| 2003/0071587 A1* | 4/2003 | Suzuki | B62D 5/046 | |
| | | | | 318/139 |
| 2004/0128042 A1* | 7/2004 | Takahashi | B62D 5/0403 | |
| | | | | 180/443 |
| 2004/0148080 A1* | 7/2004 | Ekmark | B62D 5/046 | |
| | | | | 180/443 |
| 2004/0193344 A1* | 9/2004 | Suzuki | B60T 8/885 | |
| | | | | 180/443 |
| 2004/0206569 A1* | 10/2004 | Kodama | B62D 5/046 | |
| | | | | 180/402 |
| 2004/0243287 A1* | 12/2004 | Yanaka | B60W 50/02 | |
| | | | | 701/33.6 |
| 2005/0072621 A1* | 4/2005 | Hara | B62D 1/163 | |
| | | | | 180/444 |
| 2005/0209751 A1 | 9/2005 | Kato | | |
| 2005/0234622 A1* | 10/2005 | Pillar | B60L 3/12 | |
| | | | | 701/41 |
| 2005/0257992 A1* | 11/2005 | Shiino | B62D 5/04 | |
| | | | | 180/444 |
| 2005/0279562 A1* | 12/2005 | Hara | B62D 5/003 | |
| | | | | 180/443 |
| 2007/0024111 A1* | 2/2007 | Ganzel | B60T 8/3655 | |
| | | | | 303/116.2 |
| 2008/0243339 A1* | 10/2008 | Nishimori | B60G 7/003 | |
| | | | | 701/41 |
| 2009/0000839 A1* | 1/2009 | Ishii | B62D 11/04 | |
| | | | | 701/41 |
| 2009/0032360 A1* | 2/2009 | Asano | F16D 48/062 | |
| | | | | 192/85.48 |
| 2010/0191405 A1* | 7/2010 | Sugitani | B60G 7/006 | |
| | | | | 701/31.4 |
| 2010/0222953 A1* | 9/2010 | Tang | B60W 10/08 | |
| | | | | 701/22 |
| 2010/0235049 A1* | 9/2010 | Kariatsumari | B62D 5/046 | |
| | | | | 318/609 |
| 2010/0299027 A1* | 11/2010 | Aoki | B62D 5/0484 | |
| | | | | 701/42 |
| 2011/0035114 A1* | 2/2011 | Yoneda | B62D 5/0484 | |
| | | | | 318/564 |
| 2011/0074333 A1* | 3/2011 | Suzuki | H02P 25/22 | |
| | | | | 318/724 |
| 2011/0156627 A1* | 6/2011 | Nakamura | B62D 5/0487 | |
| | | | | 318/400.22 |
| 2011/0214934 A1* | 9/2011 | Ueda | B62D 5/0463 | |
| | | | | 180/446 |
| 2012/0247846 A1* | 10/2012 | Ichikawa | B60K 1/04 | |
| | | | | 180/339 |
| 2013/0090812 A1* | 4/2013 | Chun | B62D 5/0472 | |
| | | | | 701/42 |
| 2013/0090813 A1* | 4/2013 | Kanekawa | B62D 5/0484 | |
| | | | | 701/41 |
| 2013/0098702 A1* | 4/2013 | Kamada | F16H 61/456 | |
| | | | | 180/242 |
| 2013/0241452 A1* | 9/2013 | Suzuki | H02P 21/06 | |
| | | | | 318/400.15 |
| 2013/0253773 A1* | 9/2013 | Itamoto | B62D 5/0484 | |
| | | | | 701/43 |
| 2013/0261894 A1* | 10/2013 | Kojima | B62D 6/00 | |
| | | | | 701/41 |
| 2014/0054103 A1* | 2/2014 | Kezobo | H02P 29/0243 | |
| | | | | 180/446 |
| 2014/0207335 A1* | 7/2014 | Mikamo | B62D 5/0463 | |
| | | | | 701/41 |
| 2015/0015270 A1* | 1/2015 | Muto | B62D 6/10 | |
| | | | | 324/537 |
| 2015/0151781 A1* | 6/2015 | Hauser | B62D 5/0418 | |
| | | | | 180/446 |
| 2015/0203150 A1* | 7/2015 | Ognibene | B62D 5/005 | |
| | | | | 180/403 |
| 2015/0291208 A1* | 10/2015 | Miyasaka | B62D 5/0484 | |
| | | | | 701/41 |
| 2015/0298727 A1* | 10/2015 | Kimpara | B62D 5/0484 | |
| | | | | 701/43 |
| 2015/0336606 A1* | 11/2015 | Shibuya | B62D 5/001 | |
| | | | | 180/444 |
| 2015/0353079 A1* | 12/2015 | Suzuki | B62D 5/003 | |
| | | | | 701/43 |
| 2015/0353128 A1* | 12/2015 | Shibuya | B62D 5/001 | |
| | | | | 701/41 |
| 2015/0360715 A1* | 12/2015 | Shimizu | F16D 41/064 | |
| | | | | 701/43 |
| 2016/0013741 A1* | 1/2016 | Prahlad | H02P 7/06 | |
| | | | | 318/503 |
| 2016/0043670 A1* | 2/2016 | Nakamura | B62D 5/0487 | |
| | | | | 318/400.17 |
| 2016/0052642 A1* | 2/2016 | Gordon | B64C 25/34 | |
| | | | | 701/3 |
| 2016/0082937 A1* | 3/2016 | Nakaoka | B60T 8/321 | |
| | | | | 303/15 |
| 2016/0159388 A1* | 6/2016 | Sekiya | B62D 5/0409 | |
| | | | | 180/446 |
| 2016/0200355 A1* | 7/2016 | Mori | H02P 21/22 | |
| | | | | 180/446 |
| 2016/0229445 A1* | 8/2016 | Sasaki | B62D 5/0484 | |
| 2016/0332660 A1* | 11/2016 | Sasaki | B62D 5/046 | |
| 2017/0008554 A1* | 1/2017 | Hirotani | B62D 5/0406 | |
| 2017/0259846 A1* | 9/2017 | Koseki | H02P 29/68 | |
| 2017/0315514 A1* | 11/2017 | Kitamoto | B62D 5/046 | |
| 2017/0328461 A1* | 11/2017 | Nasu | B60W 50/0098 | |
| 2017/0344299 A1* | 11/2017 | Ivanov | B60W 30/09 | |
| 2018/0086369 A1* | 3/2018 | Yanagi | B62D 5/0463 | |
| 2018/0119808 A1* | 5/2018 | Miller | B60W 20/15 | |
| 2018/0208235 A1* | 7/2018 | Miyashita | B62D 5/003 | |
| 2018/0215409 A1* | 8/2018 | Pramod | B62D 15/0235 | |
| 2018/0229762 A1* | 8/2018 | Choi | B62D 5/0403 | |
| 2018/0237058 A1* | 8/2018 | Furukawa | H02P 29/02 | |
| 2019/0023315 A1* | 1/2019 | Takizawa | B62D 5/0484 | |
| 2019/0031199 A1* | 1/2019 | Dudar | B60K 11/085 | |
| 2019/0039643 A1* | 2/2019 | Oka | B62D 6/10 | |
| 2019/0100235 A1* | 4/2019 | Min | B62D 5/0472 | |
| 2019/0135336 A1* | 5/2019 | Jeong | B62D 5/0475 | |
| 2019/0176877 A1* | 6/2019 | Sugure | B62D 5/0463 | |
| 2019/0256064 A1* | 8/2019 | Hecker | B60W 50/0205 | |
| 2019/0260324 A1* | 8/2019 | Kuramitsu | B62D 5/0484 | |
| 2019/0283768 A1* | 9/2019 | Das | B60W 50/0205 | |
| 2019/0344800 A1* | 11/2019 | Kim | B62D 5/081 | |
| 2019/0356259 A1* | 11/2019 | Oiwa | B62D 5/0412 | |
| 2020/0010094 A1* | 1/2020 | Nakada | B60W 50/023 | |
| 2020/0023887 A1* | 1/2020 | Sasaki | B62D 5/0493 | |
| 2020/0047805 A1* | 2/2020 | Oka | B62D 5/0463 | |
| 2020/0076343 A1* | 3/2020 | Zhang | H02P 23/12 | |
| 2020/0079421 A1* | 3/2020 | Kano | B62D 5/0484 | |
| 2020/0091854 A1* | 3/2020 | Tatewaki | H02P 27/08 | |
| 2020/0114888 A1* | 4/2020 | Michels | B60T 8/4077 | |
| 2020/0114967 A1* | 4/2020 | Nakajima | B62D 15/021 | |
| 2020/0136543 A1* | 4/2020 | Kawamura | H02P 6/08 | |

(56) References Cited

U.S. PATENT DOCUMENTS

| | | | |
|---|---|---|---|
| 2020/0152248 A1* | 5/2020 | Tsuda | H02P 6/10 |
| 2020/0207408 A1* | 7/2020 | Nakamura | B62D 5/049 |
| 2020/0298871 A1* | 9/2020 | Mukai | B60W 50/045 |
| 2020/0307677 A1* | 10/2020 | Uematsu | B60W 10/20 |
| 2020/0307682 A1* | 10/2020 | Fujita | H02K 11/30 |
| 2020/0307683 A1* | 10/2020 | Fujita | H02P 6/16 |
| 2020/0309566 A1* | 10/2020 | Fujita | G01L 5/221 |
| 2020/0321769 A1* | 10/2020 | Nakamura | H02H 3/28 |
| 2020/0321840 A1* | 10/2020 | Kabune | H05K 5/0017 |
| 2020/0331517 A1* | 10/2020 | Toko | B62D 5/0493 |
| 2020/0331522 A1* | 10/2020 | Yamashita | B62D 5/0403 |
| 2020/0353973 A1* | 11/2020 | Nakamura | H02P 29/40 |
| 2020/0353975 A1* | 11/2020 | Nakamura | H02P 29/028 |
| 2020/0406962 A1* | 12/2020 | Nakada | B62D 5/0484 |
| 2020/0406963 A1* | 12/2020 | Nakada | H02P 27/06 |
| 2021/0009096 A1* | 1/2021 | Mahnkopf | B60T 13/662 |
| 2021/0024126 A1* | 1/2021 | Matsumura | B62D 5/12 |
| 2021/0058018 A1* | 2/2021 | Tsuchimoto | H02P 21/22 |
| 2021/0104972 A1* | 4/2021 | Akutsu | H02P 21/22 |
| 2021/0114652 A1* | 4/2021 | Mori | H02P 29/50 |
| 2021/0129817 A1* | 5/2021 | Michels | B60T 8/1755 |
| 2021/0129855 A1* | 5/2021 | Nakao | G05B 19/0428 |
| 2021/0237749 A1* | 8/2021 | Miyamoto | B60W 50/023 |
| 2021/0237751 A1* | 8/2021 | Ochida | B60W 60/00186 |
| 2022/0024433 A1* | 1/2022 | Yuyama | B60T 8/3255 |
| 2022/0063711 A1* | 3/2022 | Otsuka | B62D 5/0463 |
| 2022/0073130 A1* | 3/2022 | Shin | B62D 5/0421 |
| 2022/0135116 A1* | 5/2022 | Won | B62D 5/0484 701/42 |
| 2022/0135119 A1* | 5/2022 | Kim | B62D 5/0463 180/446 |
| 2022/0144058 A1* | 5/2022 | Ben-Ari | F16D 1/10 |
| 2022/0166360 A1* | 5/2022 | Nakamura | H02P 29/024 |
| 2022/0166365 A1* | 5/2022 | Nakamura | H02P 29/024 |
| 2022/0185366 A1* | 6/2022 | Kim | B62D 5/046 |
| 2022/0255474 A1* | 8/2022 | Suzuki | H02P 5/60 |
| 2022/0255475 A1* | 8/2022 | Suzuki | H02P 25/22 |
| 2022/0306149 A1* | 9/2022 | Miranda | B60W 10/18 |
| 2022/0363276 A1* | 11/2022 | Wulf | B60W 50/029 |
| 2022/0379953 A1* | 12/2022 | Kim | B62D 5/0493 |
| 2023/0042441 A1* | 2/2023 | Fujita | B60W 30/02 |
| 2023/0045433 A1* | 2/2023 | Kim | B62D 5/0484 |
| 2023/0060008 A1* | 2/2023 | Williams | B62D 6/00 |
| 2023/0068424 A1* | 3/2023 | Sun | B62D 5/0484 |
| 2023/0087332 A1* | 3/2023 | Dieckmann | B60W 10/184 701/70 |
| 2023/0093616 A1* | 3/2023 | Kimura | G01B 7/30 324/207.25 |
| 2023/0117373 A1* | 4/2023 | Nagashima | B62D 6/008 701/41 |
| 2023/0192185 A1* | 6/2023 | Kim | B62D 5/0484 701/41 |

FOREIGN PATENT DOCUMENTS

| | | | | |
|---|---|---|---|---|
| CN | 108473156 A | | 8/2018 | |
| CN | 109478858 A | * | 3/2019 | ........... B60R 16/023 |
| CN | 110662681 A | * | 1/2020 | ....... B60W 30/18163 |
| DE | 102018202052 A1 | * | 8/2018 | ......... B62D 15/0235 |
| EP | 1426266 A2 | * | 6/2004 | ............. B62D 5/003 |
| EP | 1462338 A2 | * | 9/2004 | ............. B60T 8/885 |
| EP | 3299257 A1 | * | 3/2018 | ............. B62D 5/003 |
| EP | 3330160 A1 | * | 6/2018 | ............. B62D 5/001 |
| GB | 2296790 A | * | 7/1996 | ............ B60T 8/1755 |
| JP | H0747963 A | * | 2/1995 | |
| JP | 2017167024 A | * | 9/2017 | ........... B62D 5/0463 |
| JP | 2018128429 A | * | 8/2018 | ......... B62D 15/0235 |
| JP | 2019137264 A | * | 8/2019 | ........... B62D 5/0406 |
| JP | 2020092583 A | * | 6/2020 | ........ B62D 15/0215 |
| JP | 6838215 B2 | * | 3/2021 | ........ B60W 50/0205 |
| KR | 10-2013-0065353 A | | 6/2013 | |
| KR | 20130065353 A | * | 6/2013 | |
| KR | 10-2014-0133161 A | | 11/2014 | |
| KR | 10-2018-0095355 A | | 8/2018 | |
| KR | 10-2018-0128106 A | | 12/2018 | |
| KR | 10-2020-0091651 A | | 7/2020 | |
| WO | WO-2012046115 A1 | * | 4/2012 | ........... B62D 5/0403 |
| WO | WO-2014054265 A1 | * | 4/2014 | ............. B62D 5/003 |
| WO | WO-2014104253 A1 | * | 7/2014 | ............. B62D 5/001 |
| WO | WO-2014203056 A1 | * | 12/2014 | ............. B62D 5/003 |
| WO | WO-2016088718 A1 | * | 6/2016 | ............... B62D 1/28 |
| WO | WO-2018061254 A1 | * | 4/2018 | ............. B60R 16/02 |
| WO | WO-2018194024 A1 | * | 10/2018 | ........... B60R 16/027 |
| WO | WO-2018194029 A1 | * | 10/2018 | ........... B60R 16/027 |
| WO | WO-2019116870 A1 | * | 6/2019 | ........ B60W 50/0205 |
| WO | 2018/173561 A1 | | 11/2019 | |

OTHER PUBLICATIONS

"The dual-core fault-tolerant control for Electronic Control Unit of Steer-By-Wire system;" He et al.; 2010 International Conference on Computer, Mechatronics, Control and Electronic Engineering (vol. 4, pp. 436-439); Aug. 1, 2010. (Year: 2010).*

"Non-conduct steering sensor for Electric Power Steering;" Xiaoling et al.; 2009 International Conference on Information and Automation (pp. 1462-1467); Jun. 1, 2009. (Year: 2009).*

International Search Report (PCT/ISA/210) issued in PCT Application No. PCT/KR2020/000928 dated May 12, 2020 with English Translation.

Office Action dated Jul. 25, 2023 for counterpart Chinese Patent Application No. 202080010130.7.

* cited by examiner

REDUNDANCY CIRCUIT OF ELECTRIC POWER STEERING SYSTEM

CROSS-REFERENCE OF RELATED APPLICATIONS

This application is the U.S. National Phase under 35 U.S.C. § 371 of International Patent Application No. PCT/KR2020/000928, filed on Jan. 20, 2020, which claims the benefit of Korean Patent Application No. 10-2019-0008690, filed on Jan. 23, 2019, the entire disclosures of each are incorporated by reference herein.

TECHNICAL FIELD

The present invention relates to a redundancy circuit of an electric power steering system and, more particularly, to a redundancy circuit of an electric power steering system which is applicable to an autonomous vehicle.

BACKGROUND ART

In general, power steering systems are applied to vehicles as systems for reducing a steering force of a steering wheel to ensure stability of a steering state.

Conventionally, as power steering systems, hydraulic power steering (HPS) systems using hydraulic pressure have been widely used in vehicles. Recently, unlike the conventional methods using hydraulic pressure, eco-friendly electric power steering (EPS) systems using a rotational force of a motor to facilitate a steering force for a user are commonly installed in vehicles.

In such an EPS system, a motor is driven by an electronic control unit (ECU) according to driving conditions of a vehicle detected by a vehicle speed sensor, a torque sensor, and the like, thereby providing a light and comfortable steering feel during low-speed driving, providing a heavy steering feel as well as high directional stability during high-speed driving, and enabling rapid steering in an emergency situation to provide optimal steering conditions to a driver.

An ECU of the conventional EPS system may use a method in which torque applied to a torsion bar and an absolute steering angle that is a rotation amount of a steering input shaft are calculated using a first angle element for calculating an absolute steering angle and second and third angle elements for calculating a relative steering angle.

In the conventional torque and steering angle sensing method, when a failure occurs in the first to third angle elements, it is impossible to calculate the torque value and the steering angle, and as a result, a steering assistance control is not performed, resulting in serious problems in stability of a vehicle.

In consideration of the problem, the applicant's Korean Patent Publication No. 10-2018-0128106 (Apparatus and method for detecting steering information of electric power steering device, published on Dec. 3, 2018) discloses a configuration in which a plurality of torque detection sensors and a plurality of steering angle detection sensors are provided and synchronization check units configured to check the synchronization of the sensors are provided, and thus, even when some sensors fail, torque and a steering angle can be normally calculated to enable control.

Due to the configuration of the applicant's Korean Patent Publication, even when there is an abnormality in some sensors, accurate torque and a steering angle can be calculated, but when an abnormality occurs in an ECU itself that receives the calculated torque and steering angle to perform control, it may be predicted that there is no specific countermeasure.

DISCLOSURE

Technical Problem

The present invention is directed to providing a redundancy circuit of an electric power steering system which is capable of detecting an abnormality in an electronic control unit as well as an abnormality in a sensor and coping with the abnormality.

The present invention is also directed to providing a redundancy circuit of an electric power steering system which is capable of preventing a control blank in a vehicle without driver intervention, such as an autonomous vehicle.

Technical Solution

According to an exemplary embodiment of the present invention, a redundancy circuit of an electric power steering system includes a plurality of electronic control units which cross-check whether a breakdown occurs and adjust control ratios according to the occurrence of the breakdown, and a selection control unit which receives the control ratios and control amount information of the plurality of electronic control units and determines a control amount of respective motors provided in the same number as the plurality of electronic control units.

The plurality of electronic control units may include a first electronic control unit and a second electronic control unit which each include a control unit and a breakdown determination unit, and the breakdown determination unit of the first electronic control unit and the breakdown determination unit of the second electronic control unit may exchange control information through mutual internal communication to determine whether the breakdown occurs and convert a control amount of the first electronic control unit or the second electronic control unit, which is determined to break down, to 0%.

The selection control unit may include a first divider and a second divider which respectively divide a first control ratio of the first electronic control unit and a second control ratio of the second electronic control unit in half, a first subtractor which subtracts 50% of the second control ratio of the second electronic control unit from the first control ratio of the first electronic control unit, a second subtractor which subtracts 50% of the first control ratio of the first electronic control unit from the second control ratio of the second electronic control unit, a first multiplier which multiplies a first control amount of the first electronic control unit by a calculation result of the first subtractor to generate a first motor control signal and control a first motor, and a second multiplier which multiplies a second control amount of the second electronic control unit by a calculation result of the second subtractor to generate a second motor control.

The first subtractor and the second subtractor may have an output value in a range of an upper limit of 100% to a lower limit of 0%.

When the breakdown occurs in the first electronic control unit, the first control amount of the first electronic control unit in which the breakdown occurs may be decreased to 0% to control the second motor using 100% of the second control amount of the second electronic control unit.

The first control amount of the first electronic control unit may be gradually decreased from 100% to 0% in a set unit.

After it is detected that the breakdown occurs, the first control amount of the first electronic control unit may be decreased after a set breakdown count is accumulated.

Advantageous Effects

According to the present invention, a plurality of electronic control units are used, and the same torque signal and steering angle signal are provided to the electronic control units. Control signals of the electronic control units according to the torque signal and the steering angle signal are compared to detect the electronic control unit in which an abnormality occurs, and then, the control signal of the normal electronic control unit is used to drive a motor of an electric power steering system, thereby performing a normal operation even when an abnormality occurs in the electronic control unit.

In addition, according to the present invention, when use is switched from a specific electronic control unit to another electronic control unit among a plurality of electronic control units, a control blank is prevented by adjusting a time point at which the use is switched, thereby allowing a driver to not feel a sense of difference and eliminating the risk of an accident caused by a vehicle control blank in an autonomous driving situation.

-Descriptions of Reference Numerals-

Figure 1:
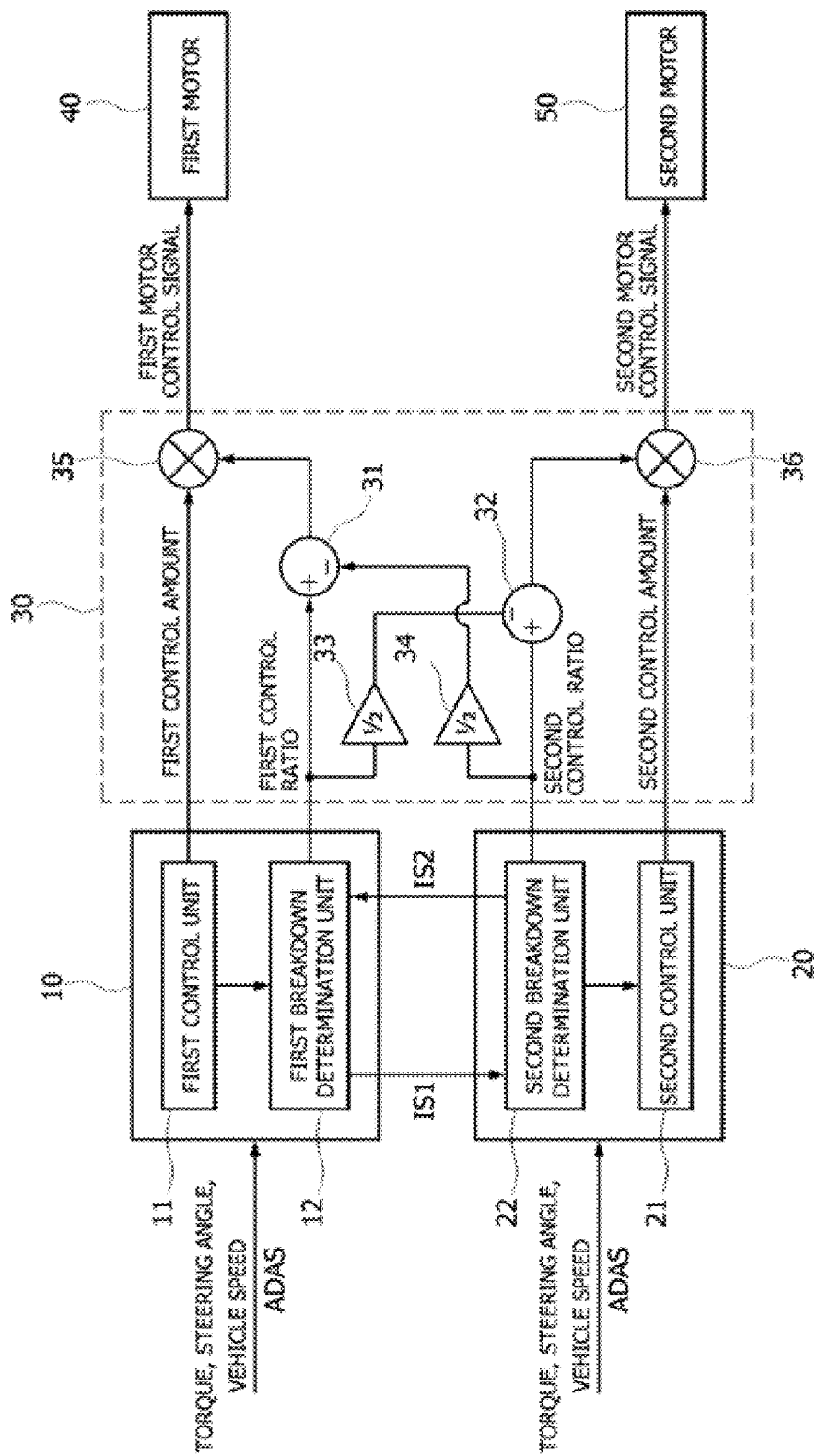
FIG. 1 is a diagram of a redundancy circuit of an electric power steering system according to an exemplary embodiment of the present invention.

| | |
|---|---|
| 10: first electronic control unit | 11: first control unit |
| 12: first breakdown determination unit | 20: second electronic control unit |
| 21: second control unit | 22: second breakdown determination unit |
| 30: control selection unit | 31: first subtractor |
| 32: second subtractor | 33: first divider |
| 34: second divider | 35: first multiplier |
| 36: second multiplier | 40: first motor |
| 50: second motor | |

MODES OF THE INVENTION

Hereinafter, a redundancy circuit of an electric power steering system of the present invention will be described in detail with reference to the accompanying drawings.

Exemplary embodiments of the present invention are provided to describe the present invention more completely to those having ordinary skill in the art, and the following exemplary embodiments may be modified in various different forms. Therefore, the scope of the present invention is not limited to the following exemplary embodiments. Rather, these exemplary embodiments are provided so that the present invention will be thorough and complete and will convey the concept of the present invention to those skilled in the art.

The terminology used herein is for the purpose of describing particular exemplary embodiments only and is not intended to limit the present invention. As used herein, the singular forms "a" and "an" are intended to include the plural forms as well, unless the context clearly indicates otherwise. It will be further understood that the terms "comprises" and/or "comprising" used herein specify the presence of stated shapes, numbers, steps, operations, members, elements, and/or groups thereof but do not preclude the presence or addition of one or more other shapes, numbers, steps, operations, members, elements, and/or groups thereof. As used herein, the term "and/or" includes any and all combinations of one or more of the associated listed items.

It is apparent that although the terms "first," "second," and the like are used herein to describe various members, regions, layers, and/or portions, these members, regions, layers, and/or portions are not limited by these terms. The terms do not mean a particular order, top and bottom, or rating but are only used to distinguish one member, region, or portion from another member, region, or portion. Accordingly, a first element, region, or portion which will be described below may indicate a second element, region, or portion without deviating from teachings of the present invention.

Hereinafter, the exemplary embodiments of the present invention will be described with reference to schematic drawings illustrating the exemplary embodiments of the present invention. Throughout the drawings, for example, according to manufacturing technologies and/or tolerances, illustrated shapes may be modified. Accordingly, the exemplary embodiments of the present invention will not be understood to be limited to certain shapes of illustrated regions but will include changes in shape occurring while being manufactured.

FIG. 1 is a diagram of a redundancy circuit of an electric power steering system according to an exemplary embodiment of the present invention.

Referring to FIG. 1, the redundancy circuit of an electric power steering system according to the exemplary embodiment of the present invention includes a first electronic control unit 10 and a second electronic control unit 20 which receive each of torque, a steering angle, a vehicle speed, and an input signal of an advanced driver assistance system (ADAS) and respectively output a first motor control signal and a second motor control signal and a control selection unit 30 which selectively outputs the first motor control signal of the first electronic control unit 10 or the second motor control signal of the second electronic control unit 20 or adjusts and outputs control amounts of the first motor control signal and the second motor control signal when a motor control signal is converted.

Hereinafter, the configuration and operation of the redundancy circuit of an electric power steering system according to the exemplary embodiment of the present invention configured as described above will be described in more detail.

First, in the present invention, the first electronic control unit 10 and the second electronic control unit 20, which control a motor using the same torque information, steering angle information, vehicle speed information, and ADAS input information, are provided.

In the present invention, although two electronic control units are illustrated and described for convenience of description, one pair of functional electronic control units may be included in one hardware configuration, and two or more electronic control units may be used instead of one pair of electronic control units.

The first electronic control unit 10 may include a first control unit 11 and a first breakdown determination unit 12, and the second electronic control unit 20 may also include a second control unit 21 and a second breakdown determination unit 12.

The first control unit 11 and the second control unit 21 each generate a control signal for controlling a motor of an electric power steering system using the input torque information, steering angle information, vehicle speed information, and ADAS input information. In this case, the control signal may include control ratio information and control amount information.

The first electronic control unit 10 and the second electronic control unit 20 exchange motor control information thereof with each other through internal communications IS1 and IS2, and while the motor control information is exchanged, whether a breakdown occurs is determined by each of the first breakdown determination unit 12 and the second breakdown determination unit 22.

In this case, the first electronic control unit 10 and the second electronic control unit 20 may exchange control information thereof to monitor each other and determine whether a breakdown occurs.

The first electronic control unit 10 and the second electronic control unit 20 are for controlling a first motor 40 and a second motor 50, respectively, and the first motor 40 and the second motor 50 may be a motor in which two coils are separated in one package or a motor having an independent configuration.

In this case, both the first motor 40 and the second motor 50 are for providing a steering feel of the electric power steering system.

In a state in which there is no abnormality in both the first electronic control unit 10 and the second electronic control unit 20, control ratios are set uniformly, and the first motor 40 and the second motor 50 are controlled using the first motor control signal and the second motor control signal having control amounts according to the control ratios.

Such a function is due to the operation of the control selection unit 30. The operation of the control selection unit 30 in a state in which there is no abnormality in both the first electronic control unit 10 and the second electronic control unit 20 will be described as follows.

The control selection unit 30 has a configuration including a first divider 33 and a second divider 34 which respectively divide a first control ratio of the first electronic control unit 10 and a second control ratio of the second electronic control unit 20 in half, a first subtractor 31 which subtracts 50% of the second control ratio of the second electronic control unit 20 from the first control ratio of the first electronic control unit 10, a second subtractor 32 which subtracts 50% of the first control ratio of the first electronic control unit 10 from the second control ratio of the second electronic control unit 20, a first multiplier 35 which generates the first motor control signal by multiplying the first control amount of the first electronic control unit 10 by a calculation result of the first subtractor 31, and a second multiplier 36 which generates the second motor control signal by multiplying the second control amount of the second electronic control unit 20 by a calculation result of the second subtractor 32.

When both the first electronic control unit 10 and the second electronic control unit 20 are in a normal state, each of the first control ratio and the second control ratio is 100%, and a value of 100% is converted into 50% by the first divider 33 and the second divider 34.

Accordingly, output values of the first subtractor 31 and the second subtractor 32 also become 50%. That is, control authority of each of the first electronic control unit 10 and the second electronic control unit 20 becomes 50%.

In this case, the control authority refers to a control amount with respect to a total amount of a required motor control amount. Thus, the first control amount calculated through the first multiplier 35 becomes 50% of the total control amount, and similarly, the second control amount calculated through the second multiplier 36 becomes 50% of the total control amount.

In other words, the control authority of each of the first electronic control unit 10 and the second electronic control unit 20 is set to 50%, and 50% of the total control amount is applied to use each of the first motor control signal and the second motor control signal and control each of the first motor 40 and the second motor 50.

In such a state, when a software or hardware abnormality occurs in the first electronic control unit 10, the software or hardware abnormality may be confirmed by the second breakdown determination unit 22 of the second electronic control unit 20, and a breakdown determination result is shared by the first electronic control unit 10 and the second electronic control unit 20 through internal communications.

The first control ratio of the first electronic control unit 10 in which an abnormality occurs is decreased from 100% to convert the first control amount of the second motor control signal to 0%. In this case, the second control ratio is set to a value such that the second control amount is maintained at 100%. That is, 100% of the second control amount is applied to use the second motor control signal and control the second motor 50.

A process of decreasing and converting the first control ratio from 100% is an operation of converting the control authority of the first electronic control unit 10 to 0% to transfer all the control authorities to the second electronic control unit 20.

On the contrary, when an abnormality occurs in the second electronic control unit 20, the second control amount of the second electronic control unit 20 is converted to 0%, and 100% of the control amount of the first electronic control unit 10 is applied to use the first motor control signal and control the first motor 40.

In the example described above, although it has been described that the first control ratio or the second control amount is immediately converted from 100% to 0%, an instantaneous change in control amount is possible, but in a process of determining a breakdown and transferring control authority, a control blank may occur during a time for which a breakdown is determined, and accordingly, a driver may feel a sense of difference, or a vehicle control blank may occur in an autonomous driving situation.

In order to prevent such problems, in the present invention, a method may be used in which control authority is linearly transferred to prevent occurrence of a vehicle control blank and to allow a driver to not feel a sense of difference.

Figure 2:
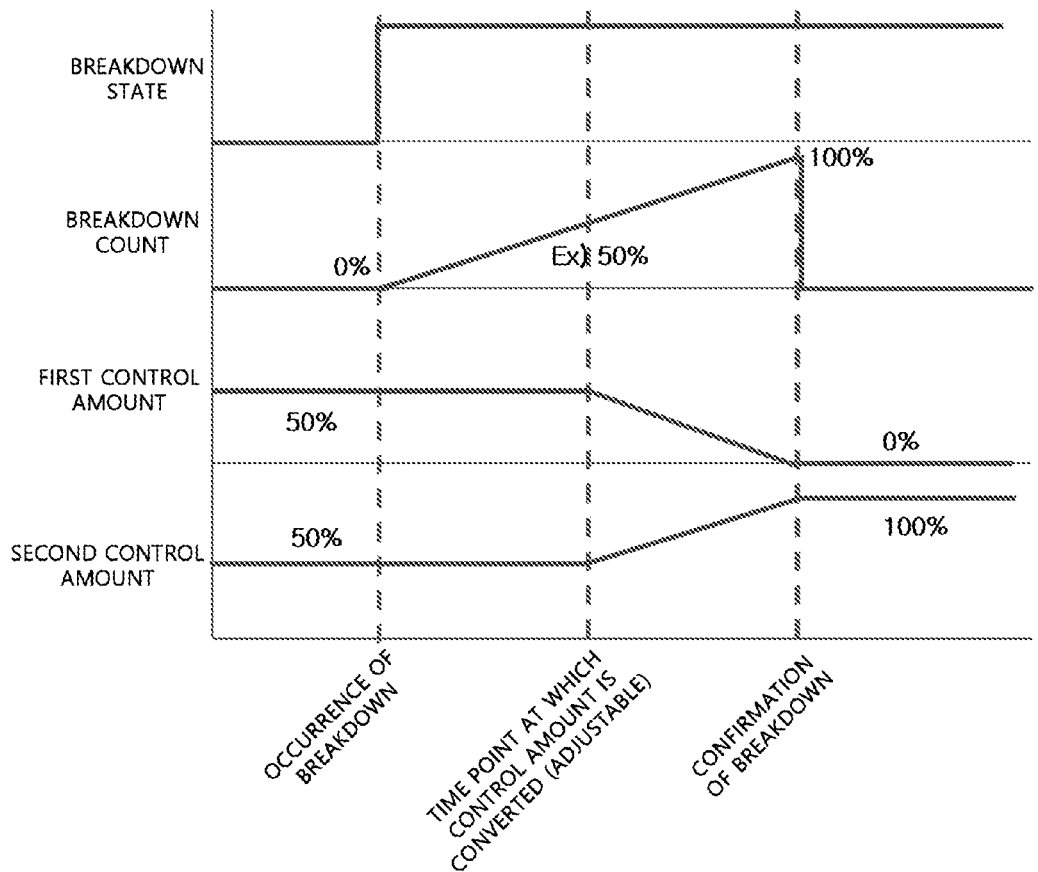
FIG. 2 is an operation waveform diagram according to an embodiment of the present invention.

FIG. 2 is a timing diagram of a transfer of control authority used in the present invention.

At a time point at which the second electronic control unit 20 detects that a breakdown occurs in the first electronic control unit 10, the first control ratio of the first electronic control unit 10 is not immediately converted to a value, at which the first control amount becomes 0%, but is gradually decreased to convert the final first control amount to 0%.

For example, at a time point at which a breakdown of the first electronic control unit 10 is confirmed or after a certain amount of time elapses from the time point, the first control ratio may be linearly decreased from 100% to convert the first control amount to 0%.

For example, in a state in which the first control ratio is decreased to 80%, an output value of the first divider 33 becomes 40% which is half, and an output of the second subtractor 32, which calculates a difference from the second control ratio increased to 120%, becomes 80%. Thus, 80% of the second control amount is applied to use the second motor control signal and control the second motor 50.

In this case, an output value of the second divider 34, which is obtained by dividing the second control ratio in half, becomes 60%, and an output of the first subtractor 31, which calculates a difference from the first control ratio of 80%, becomes 20%.

Accordingly, 20% of the total control amount is controlled using the first motor 40, and 80% of the total control amount is controlled using the second motor 50.

In this case, the first control ratio is decreased from 100% to about 66.5%. This is because, since the output of the first subtractor 31 becomes negative when the first control ratio is less than 66.5, when a lower limit of the output of the first subtractor is set to 0% and the first control ratio is less than 66.5, control authority becomes 0% and thus disappears.

An upper limit of the output of the second subtractor 32 is set to 100%, and in all ratios exceeding 100%, the output of the second subtractor 32 is 100%.

While the first control ratio of the first electronic control unit 10 in which a breakdown occurs is gradually decreased at an appropriate decrease ratio such as 1% unit or 5% unit, the second control ratio of the second electronic control unit 20 is increased by as much as a decreased amount of the first control ratio. Thus, such a process is performed until the first control amount and the second control amount finally become 0% and 100%, respectively.

The gradual decrease ratio determines slopes of slope sections of the first control amount and the second control amount in a graph of FIG. 2.

A reason for checking the number of repeated breakdowns, that is, the number of breakdown counts, without performing a transfer of control authority immediately upon detecting a breakdown of the first electronic control unit 10 is to prevent a transfer of the control authority when an instantaneous abnormality occurs in the first electronic control unit 10. In this case, the number of breakdown counts may be set arbitrarily.

As described above, in the present invention, in an electric power steering system using a plurality of electronic control units and also using the same number of motors as the electronic control unit, the electronic control units detect abnormality through mutual internal communication, and a control ratio of the electronic control unit in which an abnormality occurs is linearly decreased to 0%, thereby preventing a control loss section.

It should be obvious to those skilled in the art to which the present invention pertains that the present invention can be variously changed and modified without departing from the technical spirit of the present invention.

INDUSTRIAL AVAILABILITY

In a system using a plurality of electronic control units, whether each electronic control unit abnormally operates is checked, and a power steering system is operated using a control signal of a normally operating electronic control unit so that the present invention has industrial applicability.

The invention claimed is:

1. A redundancy circuit of an electric power steering system, comprising:
a plurality of electronic control units which cross-check whether a breakdown occurs in one of the plurality of electronic control units and respectively adjust control ratios of the plurality of electronic control units according to an occurrence of the breakdown in the one of the plurality of electronic control units to convert control authority of the one of the plurality of electronic control units to another or more of the plurality of electronic control units; and
a selection control unit which receives the adjusted control ratios and control amount information of the plurality of electronic control units and determines a control amount of respective motors provided in the same number as the plurality of electronic control units,
wherein the plurality of electronic control units include a first electronic control unit and a second electronic control unit which each include a control unit and a breakdown determination unit,
the breakdown determination unit of the first electronic control unit and the breakdown determination unit of the second electronic control unit exchange control information through mutual internal communication to determine whether the breakdown occurs in the first electronic control unit or the second electronic control unit and convert a control amount of the first electronic control unit or the second electronic control unit, which is determined to break down, to 0%, and
the selection control unit includes:
a first divider and a second divider which respectively divide a first control ratio of the first electronic control unit and a second control ratio of the second electronic control unit in half;
a first subtractor which subtracts 50% of the second control ratio of the second electronic control unit from the first control ratio of the first electronic control unit;
a second subtractor which subtracts 50% of the first control ratio of the first electronic control unit from the second control ratio of the second electronic control unit;
a first multiplier which multiplies a first control amount of the first electronic control unit by a calculation result of the first subtractor to generate a first motor control signal and control a first motor; and
a second multiplier which multiplies a second control amount of the second electronic control unit by a calculation result of the second subtractor to generate a second motor control.

2. The redundancy circuit of claim 1, wherein the first subtractor and the second subtractor have an output value in a range of an upper limit of 100% to a lower limit of 0%.

3. The redundancy circuit of claim 1, wherein, when the breakdown occurs in the first electronic control unit, the first control amount of the first electronic control unit in which the breakdown occurs is decreased to 0% to control the second motor using 100% of the second control amount of the second electronic control unit.

4. The redundancy circuit of claim 3, wherein the first control amount of the first electronic control unit is gradually decreased from 100% to 0% in a set unit.

5. The redundancy circuit of claim 3, wherein, after it is detected that the breakdown occurs, the first control amount of the first electronic control unit is decreased after a set breakdown count is accumulated.

6. A redundancy circuit of an electric power steering system, comprising:
  a plurality of electronic control units which cross-check whether a breakdown occurs and adjust control ratios according to the occurrence of the breakdown; and
  a selection control unit which receives the control ratios and control amount information of the plurality of electronic control units and determines a control amount of respective motors provided in the same number as the plurality of electronic control units,
  wherein the plurality of electronic control units include a first electronic control unit and a second electronic control unit which each include a control unit and a breakdown determination unit,
  the breakdown determination unit of the first electronic control unit and the breakdown determination unit of the second electronic control unit exchange control information through mutual internal communication to determine whether the breakdown occurs and convert a control amount of the first electronic control unit or the second electronic control unit, which is determined to break down, to 0%,
  the selection control unit includes:
    a first divider and a second divider which respectively divide a first control ratio of the first electronic control unit and a second control ratio of the second electronic control unit in half;
    a first subtractor which subtracts 50% of the second control ratio of the second electronic control unit from the first control ratio of the first electronic control unit;
    a second subtractor which subtracts 50% of the first control ratio of the first electronic control unit from the second control ratio of the second electronic control unit;
    a first multiplier which multiplies a first control amount of the first electronic control unit by a calculation result of the first subtractor to generate a first motor control signal and control a first motor; and
    a second multiplier which multiplies a second control amount of the second electronic control unit by a calculation result of the second subtractor to generate a second motor control.

7. The redundancy circuit of claim 6, wherein the first subtractor and the second subtractor have an output value in a range of an upper limit of 100% to a lower limit of 0%.

8. The redundancy circuit of claim 6, wherein, when the breakdown occurs in the first electronic control unit, the first control amount of the first electronic control unit in which the breakdown occurs is decreased to 0% to control the second motor using 100% of the second control amount of the second electronic control unit.

9. The redundancy circuit of claim 8, wherein the first control amount of the first electronic control unit is gradually decreased from 100% to 0% in a set unit.

10. The redundancy circuit of claim 8, wherein, after it is detected that the breakdown occurs, the first control amount of the first electronic control unit is decreased after a set breakdown count is accumulated.

* * * * *